US008522660B2

(12) United States Patent
Hayashi

(10) Patent No.: US 8,522,660 B2
(45) Date of Patent: Sep. 3, 2013

(54) SHEET PROCESSING APPARATUS AND IMAGE FORMING APPARATUS

(75) Inventor: Kenichi Hayashi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 748 days.

(21) Appl. No.: 12/034,839

(22) Filed: Feb. 21, 2008

(65) Prior Publication Data

US 2008/0202301 A1 Aug. 28, 2008

(30) Foreign Application Priority Data

Feb. 28, 2007 (JP) ................................. 2007-048846

(51) Int. Cl.

| | |
|---|---|
| ***B23D 36/00*** | (2006.01) |
| ***B26D 5/00*** | (2006.01) |
| ***B65H 33/04*** | (2006.01) |
| ***B65H 39/00*** | (2006.01) |

(52) U.S. Cl.

USPC ............................. 83/651; 83/358; 270/58.04

(58) Field of Classification Search

USPC .................. 83/110, 358, 359, 651; 270/21.1, 270/58.7, 58.02, 58.04, 52.17

See application file for complete search history.

(56) References Cited

U.S. PATENT DOCUMENTS

| | | | | |
|---|---|---|---|---|
| 2,433,685 | A * | 12/1947 | Dowell | 83/80 |
| 4,681,002 | A * | 7/1987 | Nakaya | 83/76.1 |
| 4,772,781 | A * | 9/1988 | Watanabe | 235/379 |
| 4,863,154 | A * | 9/1989 | Hirakawa et al. | 271/176 |
| 4,874,161 | A * | 10/1989 | Murasaki et al. | 271/265.01 |
| 5,007,739 | A * | 4/1991 | Shimano et al. | 356/634 |
| 5,848,789 | A * | 12/1998 | Ochi et al. | 271/258.01 |
| 6,672,585 | B2 * | 1/2004 | Nishida et al. | 271/211 |
| 6,997,451 | B2 * | 2/2006 | Yoshimura et al. | 270/58.12 |
| 7,107,004 | B2 * | 9/2006 | Saito | 399/405 |
| 7,233,765 | B2 * | 6/2007 | Murai et al. | 399/341 |
| 2002/0124697 | A1 * | 9/2002 | Schaede | 83/34 |
| 2003/0217627 | A1 * | 11/2003 | Teshima | 83/409 |
| 2004/0051853 | A1 * | 3/2004 | Nishida et al. | 355/41 |
| 2004/0071529 | A1 * | 4/2004 | Kawatsu et al. | 412/35 |
| 2005/0017430 | A1 * | 1/2005 | Takahashi et al. | 271/10.01 |
| 2005/0039585 | A1 * | 2/2005 | Battisti et al. | 83/13 |
| 2005/0123332 | A1 * | 6/2005 | Mochizuki et al. | 399/410 |
| 2006/0045547 | A1 * | 3/2006 | Aiyama | 399/16 |
| 2006/0202410 | A1 * | 9/2006 | Ruff et al. | 271/265.01 |
| 2006/0245802 | A1 * | 11/2006 | Shimizu | 399/367 |
| 2007/0035080 | A1 * | 2/2007 | Yamada et al. | 270/58.07 |
| 2007/0237530 | A1 * | 10/2007 | Sunada | 399/21 |

FOREIGN PATENT DOCUMENTS

| | | | | |
|---|---|---|---|---|
| JP | 57-139765 A | | 8/1982 | |
| JP | 9-221266 A | | 8/1997 | |
| JP | 2000 198613 | * | 7/2000 | 270/58.07 |
| JP | 2000-198613 | | 7/2000 | |
| JP | 2005-239309 A | | 9/2005 | |

* cited by examiner

*Primary Examiner* — Ghassem Alie
*Assistant Examiner* — Bharat C Patel
(74) *Attorney, Agent, or Firm* — Fitzpatrick, Cella, Harper & Scinto

(57) ABSTRACT

A sheet processing apparatus, by which a failure in control does not occur even if cutting wastes are conveyed by a conveying unit and an image forming apparatus having the sheet processing apparatus are provided. The sheet processing apparatus has a cutter unit for cutting a sheet, a dust box for accommodating the cutting wastes, a conveying belt pair which conveys the cut sheet, sensors for detecting the sheet conveyed by the conveying belt pair, and a controller for controlling conveyance of the sheet based on the signals detected by the sensors, wherein when the length of the sheet detected by the sensor is equal to or less than a predetermined amount, the controller does not determine the sheet as a sheet.

16 Claims, 13 Drawing Sheets

SHEET PROCESSING APPARATUS AND IMAGE FORMING APPARATUS

BACKGROUND OF THE INVENTION

1. Field of the Invention

The present invention relates to a sheet processing apparatus and an image forming apparatus, and more particularly to a sheet processing apparatus for performing a cutting process to a booklet formed by stapling a plurality of sheets and conveying it and an image forming apparatus including the sheet processing apparatus.

2. Description of the Related Art

Conventionally, a sheet processing apparatus having a cutting apparatus for improving the appearance of a sheet bundle as a product by folding the central portion of sheets and cutting an edge of the sheet bundle folded to two portions at a stapled position thereof is widely known in Japanese Patent Application Laid-Open No. 2000-198613 and the like.

As shown in, for example, FIG. 12, the sheet processing apparatus conveys once a saddle-stapled booklet S between upper and lower cutting blades 51, 52 and cuts the booklet S located therebetween by lowering the upper blade 51 to the lower blade 52. Cutting wastes generated as cut pieces by cutting the sheets drop by self weight and are accommodated in a dust box 53 located therebelow.

In FIG. 12, a swing guide 54 guides the sheet bundle from a conveying belt 55 to the lower blade 52 when the bundle passes as well as swings and moves down when the sheets are cut and evacuates so that it does not prevent the cutting waste from dropping into the dust box 53. On the completion of cutting, the swing guide 54 swings and moves upward again and guides a next a bundle. Thereafter, the cut booklet S is conveyed to a not shown bundle accommodation unit and accommodated therein again.

However, in the conventional apparatus since the cut wastes drop into the dust box by the self weight, when they are subjected to external resistance (static electricity, air resistance, sliding resistance), they may not drop into the dust box 53. When the wastes cannot drop within a predetermined time, the swing guide 54, which is moving downward, moves upward again and closes a path to the dust box. Thus, even if the cutting wastes can drop, they remain on the swing guide 54. This phenomenon is liable to occur when cutting wastes has a small self weight, that is, their width is set to a small size.

Further, when the cutting wastes moves in a conveying path, sensors in the conveying path ordinarily cannot identify sheets and erroneously detect them, from which failures occur in control. Exemplified as the failures, are, for example, a failure of adding the number of cutting wastes to the number of counted sheets, a failure of erroneously recognizing that an interval between sheets is narrowed by detecting cutting wastes and feeding back the recognition to an inter-sheet control at the side providing sheets.

SUMMARY OF THE INVENTION

An object of the present invention is to provide a sheet processing apparatus in which a failure in control does not occur even if cut pieces are conveyed by a conveying unit and an image forming apparatus having the sheet processing apparatus.

Another object of the present invention is characterized by including a cutting unit for cutting a sheet, a sheet conveying unit for conveying the sheet cut by the cutting unit, a detection unit for detecting the length in a sheet conveying direction of the sheet conveyed by the conveying unit, and a controller which does not determine the sheet as a sheet and determines that it is a cut piece cut by the cutting unit when the length in the sheet conveying direction of the sheet detected by the detection unit is equal or less a predetermined amount.

According to the present invention, when a cut piece generated in a cutting operation is not accommodated in an accommodation unit and remains in a conveying path, the controller does not determine the cut piece as a sheet if the length of the cut piece in the sheet conveying direction is equal to or less than the predetermined amount. Accordingly, even if the cut piece is conveyed, a conveying process is performed as it is and no failure in operation occurs.

Further features of the present invention will become apparent from the following description of exemplary embodiments with reference to the attached drawings.

DESCRIPTION OF THE EMBODIMENTS

Next, a sheet processing apparatus according to an embodiment of the present invention and an image forming apparatus using the sheet processing apparatus will be specifically described referring to drawings.

(First Embodiment)

Figure 1:
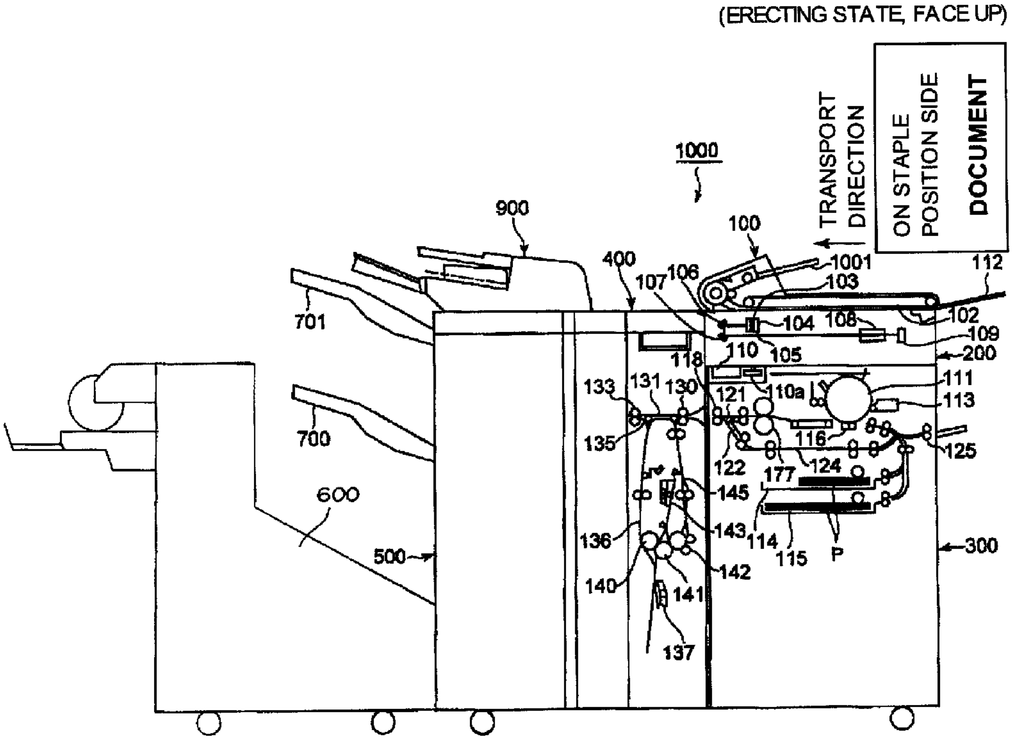
FIG. 1 is a cross sectional explanatory view of an image forming apparatus including a sheet cutting apparatus.
Figure 2:
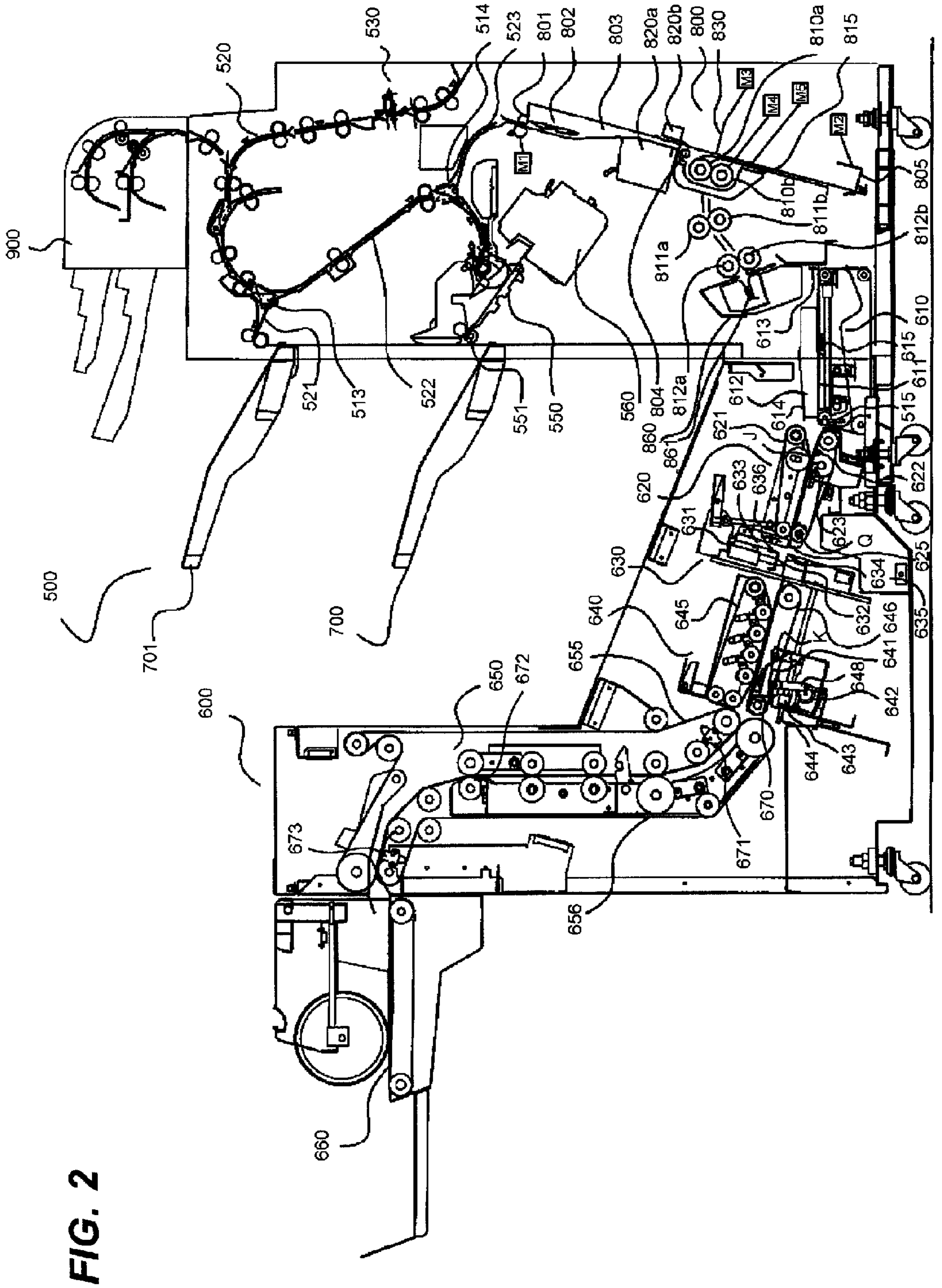
FIG. 2 is a cross sectional explanatory view of a fold processing unit, a finisher, a saddle-stapled book binding unit, and a trimmer unit.

FIG. 1 is a cross sectional explanatory view of a copy machine which is an image forming apparatus using a sheet processing apparatus according to a first embodiment, and FIG. 2 is a cross sectional explanatory view of the sheet processing apparatus.

(Overall Arrangement of Image Forming Apparatus)

As shown in FIG. 1, a copy machine 1000 of the embodiment has a document feeding unit 100, an image reader unit 200, a printer unit 300, a fold processing unit 400, a finisher 500, a the saddle stapled book binding unit 800, (refer to FIG. 2), an inserter 900, and the like. The fold processing unit 400, the saddle stapled book binding unit 800, the inserter 900, and the like may be optionally provided.

With reference to FIG. 1, it is assumed that documents are set on a tray 1001 of the document feeding unit 100 in an erecting state as well as in a face up state (state that the surface on which an image is formed faces upward) when viewed from a user and that the stapled position thereof of each document is located on the left side of the document. The documents set on the tray 1001 are conveyed sequentially one by one in a left direction (arrow direction in the drawing) from the leading page thereof, that is, from the stapled position thereof as an extreme end by the document feeding unit 100. Then, the document is further conveyed on a platen glass 102 from a left direction to a right direction through a curved path and hereafter discharged onto a discharge tray 112. Note that, at this time, the scanner unit 104 is held at predetermined position, and a document read processing is performed (document flow reading) by causing the document to pass on the scanner unit 104 from left to right.

When the document passes on the platen glass 102, it is illuminated by a lamp 103 of the scanner unit 104, and the light reflected from the document is guided to an image sensor 109 through mirrors 105, 106, 107, and a lens 108.

Note that it is also possible to perform the document read processing by stopping the document conveyed by the document feeding unit 100 on the platen glass 102 once and moving the scanner unit 104 from left to right in the state (document fix reading). When the document is read without using the document feeding unit 100, the user lifts up the document feeding unit 100 and sets the document on the platen glass 102. In this case, the document fix reading described above is performed.

The image data of the document read by the image sensor 109 is sent to an exposure controller 110 after it is subjected to a predetermined image processing. The exposure controller 110 outputs a laser beam in response to image signals. Output of the laser beam causes an image to be formed by an image forming unit using an electrostatic record system.

That is, the laser beam is illuminated onto a photosensitive drum 111 while being scanned by a polygon mirror 110*a*, and an electrostatic latent image is formed on the photosensitive drum 111 in response to the scanned laser beam.

The electrostatic latent image formed on the photosensitive drum 111 is developed by a development device 113 and visualized as a toner image. On the other hand, a recording sheet is conveyed from any of cassettes 114, 115, a manual sheet feeder 125, and a duplex conveying path 124 to a transfer unit 116. Then, the visualized toner image is transferred onto a recording sheet P in the transfer unit 116. A fix processing is performed to the recording sheet to which the toner image is transferred by a fixing unit 177.

The recording sheet passed through the fixing unit 177 is guided once to a path 122 by a switching member 121, and after the rear end of the recording sheet passes through the switching member 121, it is switched back and conveyed to a discharge roller 118 by the switching member 121. Then, the recording sheet is discharged from the printer unit 300 by a discharge roller 118. With this operation, the recording sheet can be discharged from the printer unit 300 with the surface thereof on which the toner image is formed facing downward (facedown) (inverted discharge).

As described above, the recording sheet is discharged to the outside of the machine in the face down state. With this operation, the order of pages can be collated when an image forming processing is performed sequentially from a leading page, for example, when the image forming processing is performed using the document feeding unit 100 or when it is performed to image data from a computer.

Further, when the image forming processing is performed to the both sides of the sheet, the sheet is guided straight from the fixing unit 177 to the discharge roller 118 and switched back just after the rear end of the sheet passes through the switching member 121, an then it is guided to a duplex conveying path by the switching member 121.

(Fold Processing Unit and Finisher)

Next, arrangements of the fold processing unit 400 and the finisher 500 will be described referring to FIG. 1 and FIG. 2.

The fold processing unit 400 has a conveying path 131 for introducing the sheet discharged from the printer unit 300 and guiding it to the finisher 500 side. Conveying roller pairs 130, 133 are disposed on the conveying path 131. Further, a switching member 135 disposed in the vicinity of the conveying roller pair 133 is used to guide the sheet conveyed by the conveying roller pair 130 to a folding path 136 or to the finisher 500 side.

When a folding processing of the sheet is performed, the switching member 135 is switched to the folding path 136 side, and the sheet is guided to the folding path 136. The sheet guided to the folding path 136 is conveyed up to a folding roller and folded to a Z-shape. On the other hand, when the folding processing is not performed, the switching member 135 is switched to the finisher 500 side so that the sheet discharged from the printer unit 300 is directly sent through the conveying path 131.

The extreme end of the sheet conveyed through the folding path 136 is abutted against a stopper 137 to thereby form a loop so that the sheet is folded by the folding rollers 140, 141. A loop, which is formed by abutting the folded portion against a stopper 143 disposed thereabove, is further folded by the folding roller 141 and a folding roller 142, thereby the sheet is Z-folded. The Z-folded sheet is sent to the conveying path 131 through a conveying path 145 and discharged to the finisher 500 attached to downstream side of a sheet conveying direction (hereinafter, simply referred to as “downstream side”) by a conveying roller pair 133. Note that the folding processing operation performed by the fold processing unit 400 is selectively performed.

The finisher 500 performs a processing for capturing the sheets from the printer unit 300 conveyed through the fold processing unit 400, align the plurality of captured sheets, and bundle them as a sheet bundle. Further, the finisher 500 performs sheet processings such as a staple processing (binding process) for stapling the rear end side of the sheet bundle, a sort processing, and a non-sort processing.

As shown in FIG. 2, the finisher 500 includes a conveying path 520 for capturing the sheet conveyed through the fold processing unit 400 into the inside of the apparatus, and the conveying path 520 is provided with a plurality of conveying roller pairs.

A punch unit 530 is disposed in a midway of the conveying path 520 and performs a hole forming operation when necessary to the rear end of the conveyed sheet.

A switching member 513 disposed to the terminal end of the conveying path 520 switches a path to an upper discharge path 521 connected to a downstream side and to a lower discharge path 522. The upper discharge path 521 discharges the sheets onto an upper stack tray. In contrast, the lower discharge path 522 discharges the sheets to a processing tray 550. The sheets discharged to the processing tray 550 are accommodated in a bundle state while being sequentially aligned, subjected to sort processing and a staple processing in response to a setting from an operation unit, and thereafter discharged onto stack trays 700, 701 by the bundle discharge roller pair 551.

Note that the above staple processing is performed by a stapler 560, the stapler 560 can be moved in the sheet width direction and can staple the sheets at an arbitrary position thereof.

(Saddle-Stitched Book Binding Unit)

Figure 3:
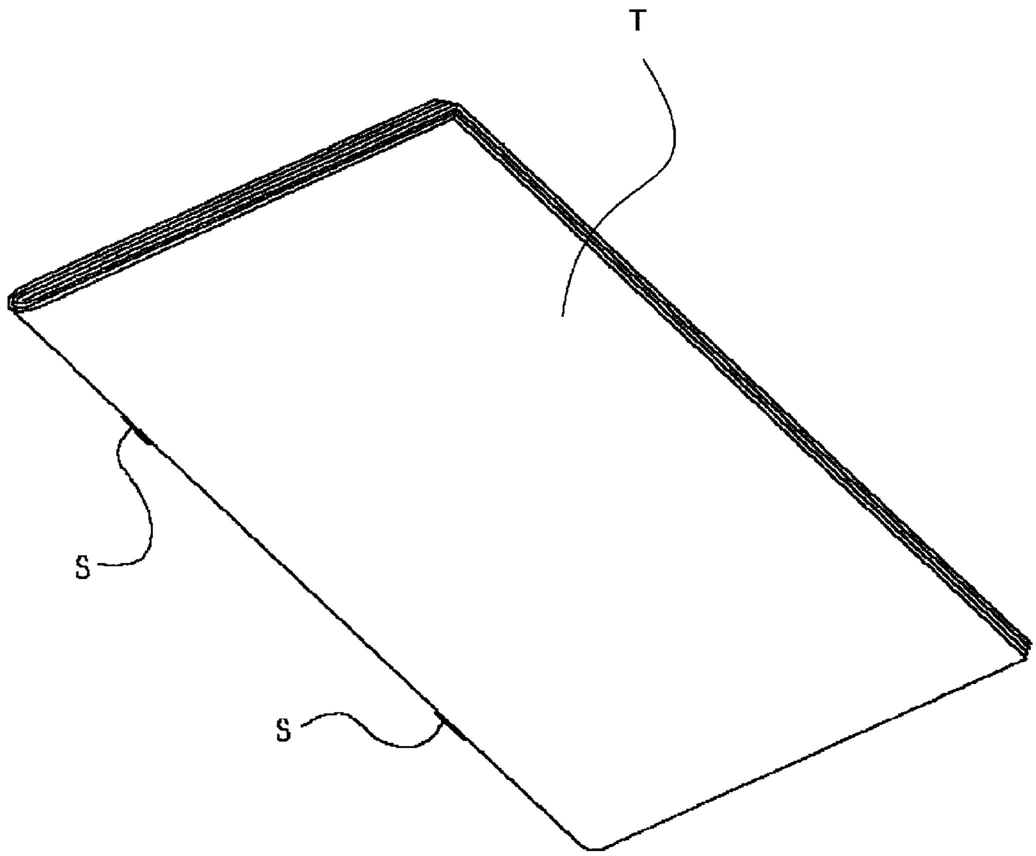
FIG. 3 is an explanatory view of a sheet bundle subjected to folding processing.

Next, an arrangement of the saddle stapled book binding unit 800 will be described using FIG. 2. The sheets, which are switched to a right side by a lower discharge path 522 disposed in a midway of a switching member 514, pass through a saddle discharge path 523 and sent to the saddle stapled book binding unit 800 shown in FIG. 2. The sheets are delivered to a saddle inlet roller pair 801, the carrying-in entrances thereof are selected by a switching member 802 which is operated by a solenoid according to a sheet size, and the sheets are carried in an accommodation guide 803 of the saddle stapled binding making unit 800. The carried sheets are conveyed until the extreme ends thereof come into contact with a movable sheet positioning member 805 by a sliding roller 804. The saddle inlet roller pair 801 and the sliding roller 804 are driven by a motor M1. Further, a stapler 820 are disposed at a position in a midway of the accommodation guide 803 so as to face with each other across the accommodation guide 803. The stapler 820 is divided into a driver 820*a* for projecting staple needle S (refer to FIG. 3) and an anvil 820*b* for bending the projected needle. Note that the sheet positioning member 805 stops the sheets so that the central portion in the sheet conveying direction stops at the staple position of the stapler 820 when the sheets are conveyed. The sheet positioning member 805 is driven by a motor M2 so as to free to move and the position thereof can be changed according to a sheet size.

The folding roller pair 810 (810*a*, 810*b*) is disposed downstream of the stapler 820 and a projection member 830 is disposed to a position facing the folding roller pair 810. The projection member 830 uses a position evacuating from the accommodation guide 803 as a home position and projects toward the sheet bundle accommodated by driving a motor M3 to thereby fold the sheet bundle while forcibly inserting it into the nip of the folding roller pair 810. Thereafter, the projection member 830 returns to the home position again. Note that a pressure F1 sufficient to crease the bundle is applied to between the folding roller pair 810 by a not shown spring. The creased sheet bundle is discharged onto a folded bundle discharge tray (not shown) by a first folded sheet conveying roller pair 811 (811*a*, 811*b*), a second folded sheet conveying roller pair 812 (812*a*, 812*b*). Note that pressures F2 and F3 sufficient to convey and stop the creased bundle are also applied to the first folded sheet conveying roller pair 811 and the second folded sheet conveying roller pair 812.

The folding roller pair 810, the first folded sheet conveying roller pair 811, and the second folded sheet conveying roller pair 812 are rotated by the same motor M4 (not shown) at the same speed.

Further, when the sheet bundle stapled by the stapler 820 is folded, the sheet positioning member 805 is moved downward a predetermined distance from the position at which the staple processing is performed so that the stapled position of the sheet bundle is located at the nip position of the folding roller pair 810 after the completion of the staple processing. With this operation, the sheet bundle can be folded around the position thereof at which the staple processing is applied.

Further, in FIG. 2, an alignment plate pair 815 has a surface projecting into the accommodation guide 803 while turning around the outer peripheral surfaces of the folding roller pairs 810*a*, 810*b* and aligns the sheets accommodated in the accommodation guide 803. The alignment plate pair 815 is driven by a motor M5 and positions the sheets in the width direction thereof by moving in a clamping direction with respect to the sheets.

A press unit 860 is disposed to downstream of the second folded conveying roller pair 812 so as to spatially overlap the folded bundle discharge tray. The press unit 860 reinforces a crease by moving in a direction orthogonal to a sheet bundle conveying direction and moving after the crease of the sheet bundle is nipped by a pair of press rollers 861. As described above, a booklet-shaped sheet bundle T of FIG. 3 is formed.

(Trimmer Unit)

Next, a trimmer unit 600 will be described using FIG. 2. In the trimmer unit 600 of the embodiment, a first conveying unit 610, a second conveying unit 620, a trim unit 630, a third conveying unit 640, a fourth conveying unit 650, and a discharge unit 660, which constitute a sheet bundle conveying unit, are disposed sequentially from the upstream side of the sheet conveying direction (hereinafter, simply referred to as "upstream side").

The first conveying unit 610 has a lower conveying belt 611 only on a lower side thereof to receive the sheet bundle from the saddle stapled book binding unit 800. Side guides 612 are disposed on both the sides of the lower conveying belt 611 and operate in the width direction of the sheet bundle to thereby correct the skew of the sheets. Further, each of the side guides 612 includes a press guide 614 for preventing opening of the sheet bundle so that the sheet bundle can be smoothly delivered to the second conveying unit 620.

A first conveying unit inlet sensor 615 and a first conveying unit outlet sensor 616 are disposed on the upstream and downstream sides of the press guide 614 to detect whether the sheet bundle is present or not. Conveying claws 613 are disposed on both the sides of the lower conveying belt 611. The conveying claws 613 can move in the sheet conveying direction of the sheet bundle and move at the same speed as the lower conveying belt 611 to deliver the sheet bundle to the second conveying unit 620. When slip occurs between the lower conveying belt 611 and the sheet bundle, the conveying claws 613 come into contact with the rear end of the sheet bundle opposite to the crease thereof, thereby the conveying claws 613 conveys the sheet bundle while pushing the rear end thereof so that it cannot be conveyed.

Next, the second, third, and fourth conveying units have pairs of conveying belts 621 and 622, 645 and 646, and 655 and 656, respectively, the conveying belts above and below the respective conveying units are driven by the same motor so that they have the same conveying speed.

Figure 4:
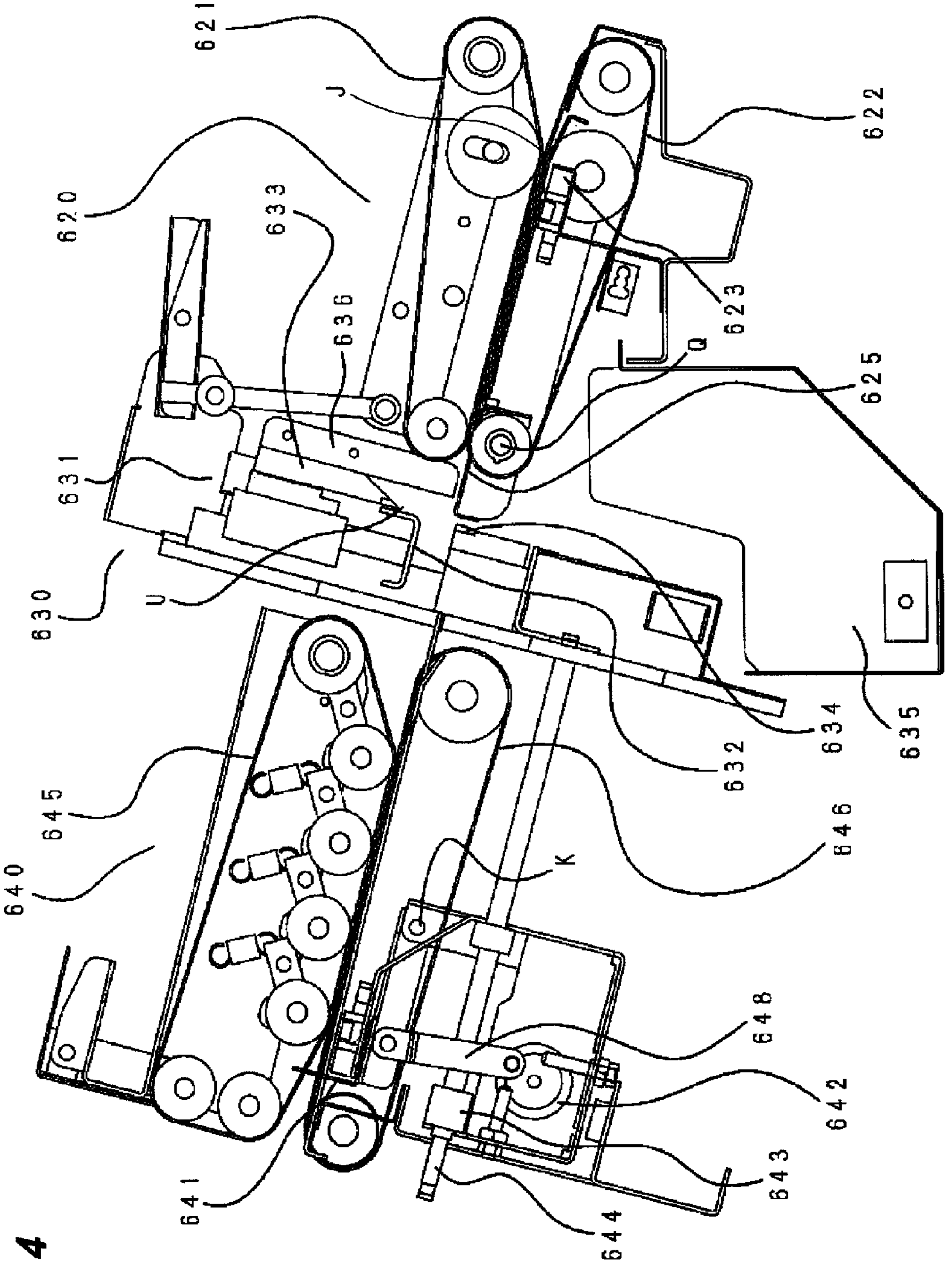
FIG. 4 is a cross sectional explanatory view of the sheet cutting apparatus.

FIG. 4 is an enlarged explanatory view of the trim unit. As shown in FIG. 4, a second conveying unit inlet sensor 623 is disposed to the clamp portion J of the second conveying unit 620 to detect that the sheet bundle is delivered to the second conveying unit 620. A stopper 641, which can appear to and disappear from a conveying path and can move also in the sheet conveying direction, is disposed to the third conveying unit 640. The stopper 641 acts as a sheet bundle positioning unit for positioning the sheet bundle being conveyed in the sheet bundle conveying path, is driven by a motor through cams 642, 648 using a portion k as a center of turn, and can appear to and evacuate from the conveying path. Further, the stopper 641 is mounted on a slide block 643 and driven by a not shown motor so as to move along a slide guide 644 and moves according to the size of the sheet bundle in the sheet conveying direction and the stop position thereof. The fourth conveying unit 650 conveys the sheet bundle upward.

Figure 7:
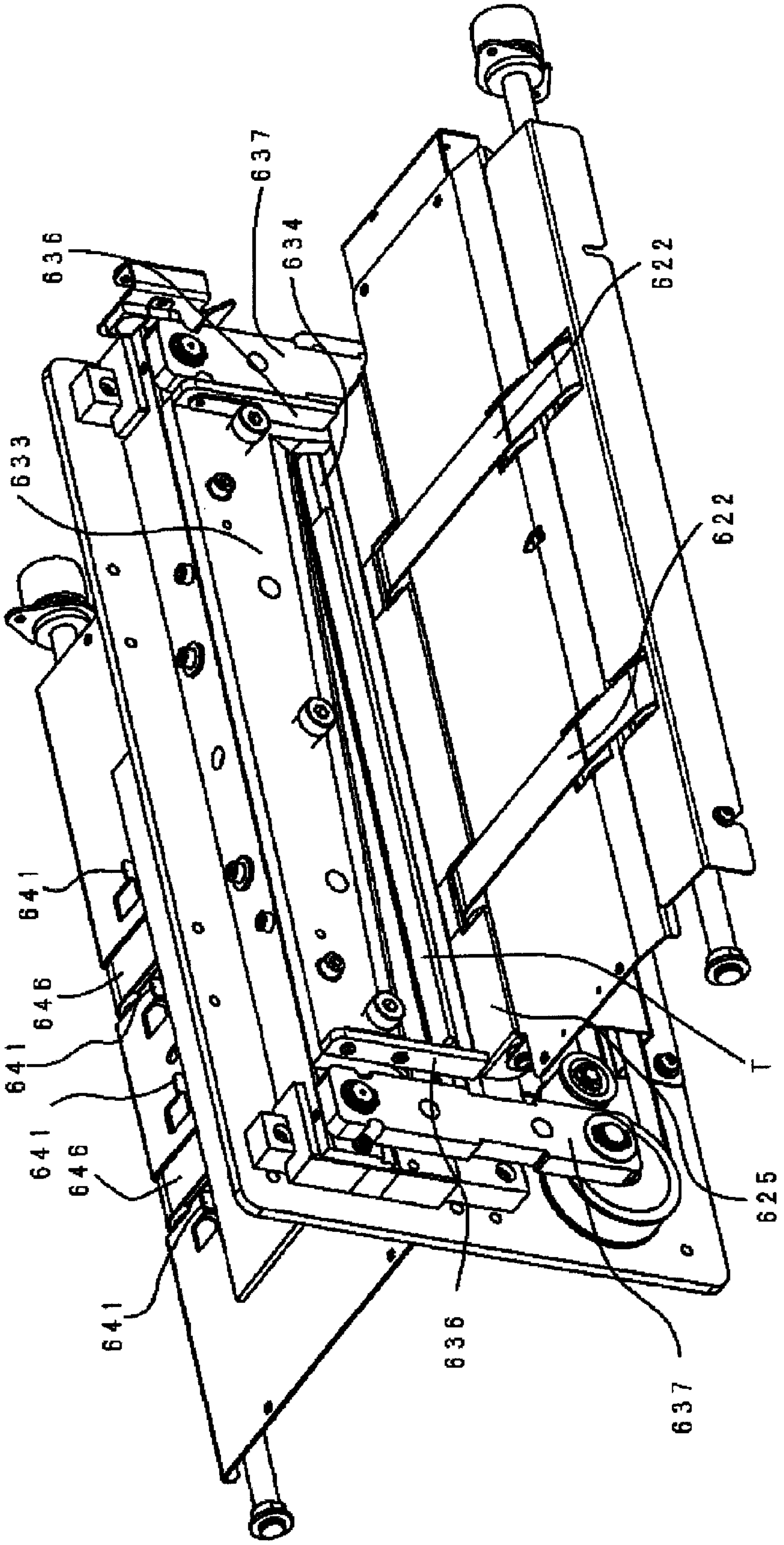
FIG. 7 is a perspective explanatory view of the sheet cutting apparatus.

A cutter unit 631 acting as a sheet bundle cutting unit is disposed to the trim unit 630 in a direction orthogonal to the conveying path. FIG. 7 is a perspective explanatory view of the cutter unit 631. FIG. 7 shows only the components in the vicinity of the third conveying unit 640 and omits the conveying belt on the upper side.

The cutter unit 631 is driven by a not shown motor and moved up and down by a link 637 in a vertical direction with respect to a conveying surface. A press member 632 and an upper blade 633 are disposed in the cutter unit 631. The up/down movement of the cutter unit 631 causes the upper blade 633 as a movable blade to move between a first position where the upper blade 633 starts a cutting operation and a second position where the upper blade 633 completes the cutting operation. In the embodiment, an upper dead point U (refer to FIG. 6), which is located in the vicinity of the uppermost point of the upward movable range of the cutter unit 631 is set as the first position, and a lower dead point D (refer to FIG. 8), which is located in the vicinity of the lowermost point of the downward movable range of the cutter unit 631, is set as the second position. The motor is rotated and stopped so that the cutter unit 631 stops at the upper dead point U and the lower dead point D. The movable region of the cutter unit 631 is set in consideration of the manufacturing errors and the attachment errors of parts, an offset of response of the motor, and the like in order to secure a stroke necessary to cut the sheet bundle. Accordingly, the upper dead point U and the lower dead point D of the upper blade 633 need not to agree with the uppermost point and the lowermost point of the movable region.

The upper blade 633 ordinarily stops at the upper dead point as an initial position. When the sheet bundle is cut, the upper blade 633 moves down from the upper dead point toward the lower dead point, and the upper blade 633 and a lower blade 634 as a fixed blade cut the sheet bundle in cooperation with each other during the downward movement of the upper blade 633. Note that when the cutter unit 631 moves down, the press member 632 comes into contact with the sheet bundle prior to the downward movement of the cutter unit 631. The press member 632 is urged in a lower direction by a not shown spring. Accordingly, the sheet bundle can be cut while being clamped.

When the cutter unit 631 moves down, a shutter 625, which is disposed on the downstream side of the second conveying unit 620, is pushed by cams 636 attached to both the sides of the cutter unit 631 externally of the sheet bundle conveying path. With this operation, the shutter 625 is opened and closed (turned) around a fulcrum Q in synchronism with the downward movement of the cutter unit 631. The shutter 625 constitutes a shutter member for opening and closing a cutting waste path through which cutting wastes as cut pieces pass into a cutting waste accommodation unit.

Further, a dust box 635 as the cutting waste accommodation unit is disposed below the cutter unit 631 to accommodate cutting wastes cut by the cutter unit 631. When, for example, the upper blade 633 is located at the upper dead point and the shutter 625 is not pushed by the cams 636, the shutter 625 is urged by a not shown twist coil spring and acts as a conveying guide for connecting the lower blade 634 from the conveying belt 622 and forms a part of the bundle sheet conveying path. At the time, the shutter 625 closes the cutting waste path to the dust box 635.

Further, as shown in FIG. 2, a discharge unit 660 is disposed most downstream, and the sheet bundle conveyed by the fourth conveying unit 650 is stacked thereon.

(Controller)

Figure 5:
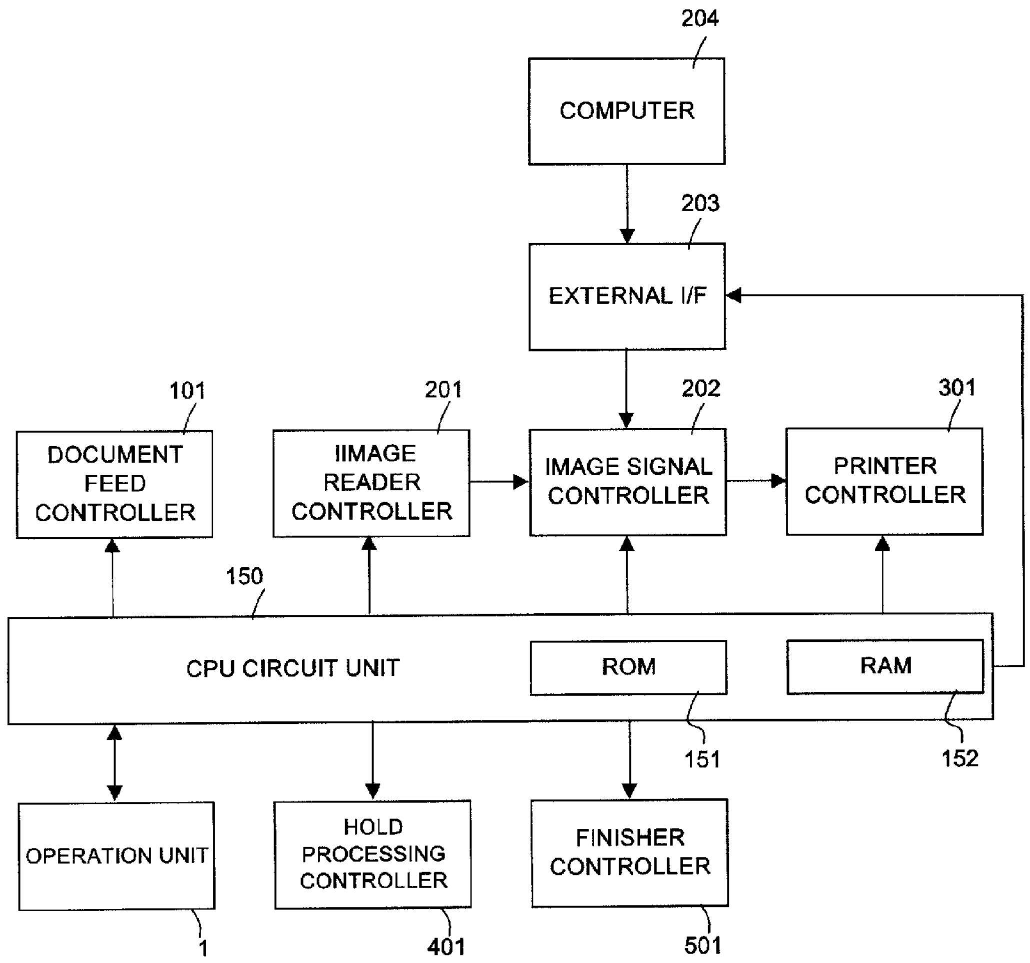
FIG. 5 is a block diagram of a controller.

FIG. 5 is a block diagram showing an arrangement of a controller of the copy machine 1000. A CPU circuit unit 150 has a CPU (not shown). A document feed controller 101, an image reader controller 201, an image signal controller 202, a printer controller 301, a fold processing controller 401, a finisher controller 501, and an external I/F 203 are controlled according to the settings made by the control program stored to a ROM 151 and an operation unit 1. Then, the document feed controller 101 controls the document feeding unit 100, the image reader controller 201 controls the image reader unit 200, and the printer controller 301 controls the printer unit 300. Further, the fold processing controller 401 controls the fold processing unit 400, the finisher controller 501 controls the finisher 500, the trimmer unit 600, the saddle stapled book binding unit 800, and the inserter 900.

The operation unit 1 has a plurality of keys for setting various types of functions relating to image formation, a display unit for displaying set states. Then, key signals corresponding to the manipulation of respective keys performed by the user are output to the CPU circuit unit 150 as well as corresponding information is displayed on the display unit based on the signals from the CPU circuit unit 150.

A RAM 152 is used as a region for temporarily storing control data and as a working region for performing an arithmetic operation for control. The external I/F 203 is interface between the copy machine 1000 and an external computer 204, develops the print data from the computer 204 to an bit map image, and outputs it to the image signal controller 202 as image data. Further, the image of the document read by an image sensor (not shown) is output from the image reader controller 201 to the image signal controller 202. The printer controller 301 outputs the image data from the image signal controller 202 to an exposure controller (not shown).

(Sheet Bundle Cutting Operation)

Next, operations of the respective portions of a sheet bundle conveying unit in the trimmer unit 600 of the present invention will be described based on the above arrangement together with a flow and a cut processing of the sheet bundle.

The sheet bundle whose crease is reinforced by the press unit 860 is conveyed again and delivered to the first conveying unit 610 of the trimmer unit 600. The lower conveying belt 611 of the first conveying unit 610 is rotated to thereby convey the sheet bundle, and after the sheet bundle is detected by the first conveying unit outlet sensor 616, the conveyance thereof is stopped once. Thereafter, the side guides 612 disposed on both the sides of the conveying path performs an alignment operation. Thereafter, the conveyance of the sheet bundle is resumed by the conveying claws 613 and the lower conveying belt 611 disposed on the upstream side of the first conveying unit. Then, when the sheet bundle is detected by the second conveying unit inlet sensor 623 disposed to the clamp portion J of the second conveying unit 620, the conveying claws 613 evacuate upstream of the sheet conveying direction. On the other hand, the sheet bundle passes through the second conveying unit 620 and the trim unit 630 and is conveyed to the third conveying unit 640.

Figure 6:
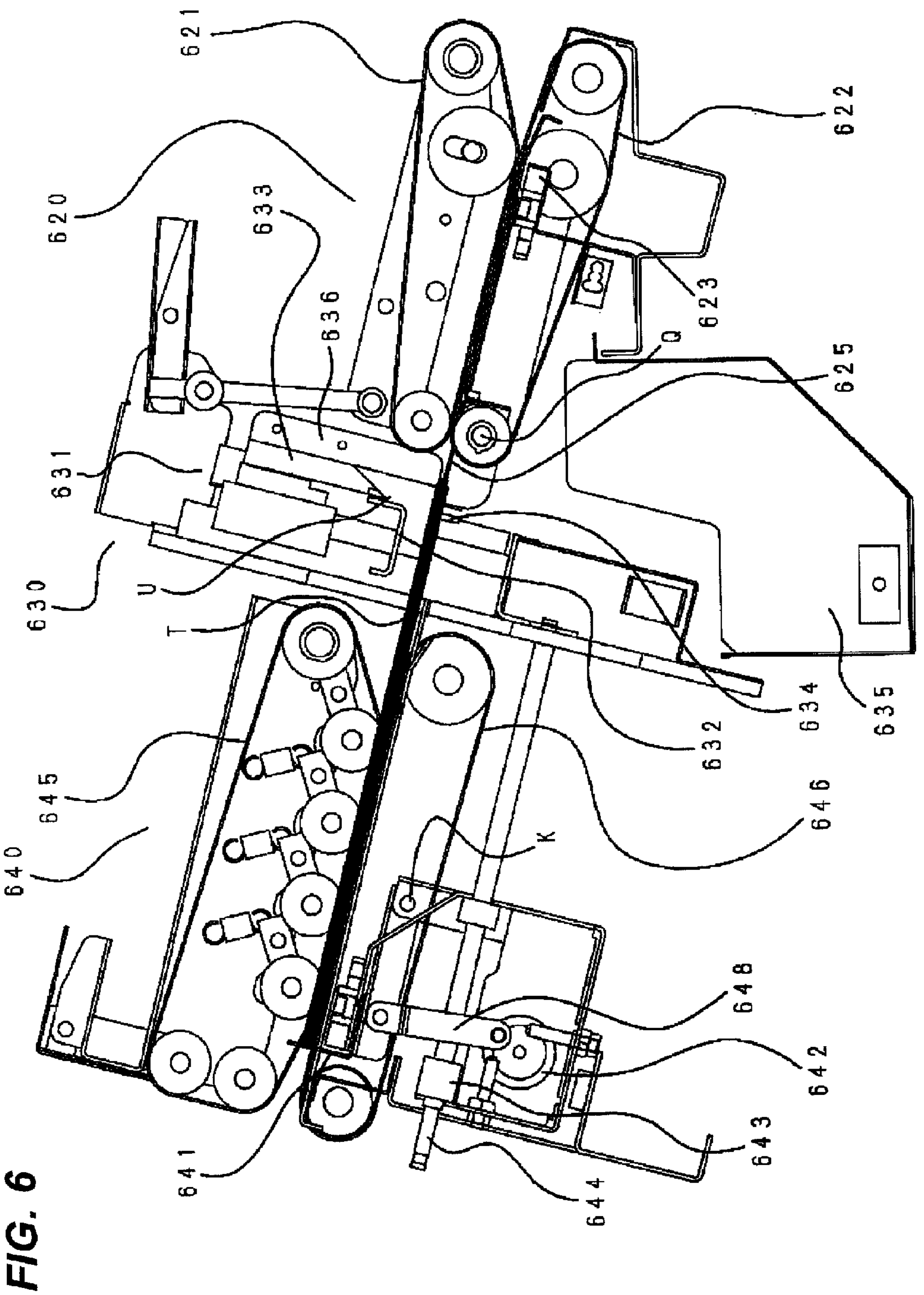
FIG. 6 is an explanatory view of the sheet cutting apparatus in a state that an upper blade is located at an upper dead point.

In the third conveying unit 640, the stopper 641 previously appears to an appropriate position on the conveying path according to the size of the sheet bundle being conveyed, and the sheet bundle is abutted against the stopper 641 and stops at a predetermined position (FIG. 6).

Further, the position of the stopper 641 is also controlled according an amount of cut (length to be cut in the sheet conveying direction) previously set by the operation unit 1. That is, when the amount of cut is set large, the sheet bundle is stopped at the position of the stopper appearing on an upstream side, whereas when it is set small, the sheet bundle is stopped at the position of the stopper appearing on a downstream side. Although the amount of cut is set to an arbitrary value, the maximum value thereof is set to L1 in the embodiment for the purpose of explanation. Further, the minimum size of a saddle-stitched booklet conveyed to the trimmer unit 600 is set to L2. L1 is very small to L2.

Figure 8:
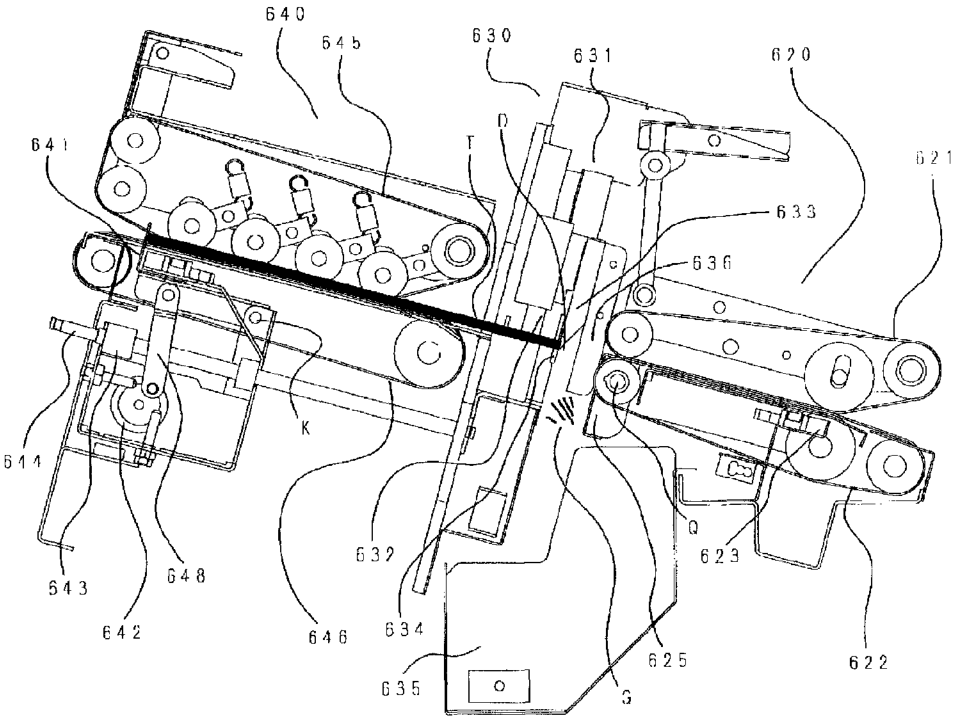
FIG. 8 is an explanatory view the sheet cutting apparatus in a state that the upper blade is located at a lower dead point.

Thereafter, the conveying belt of the third conveying unit 640 stops, the cutter unit 631 of the trim unit 630 begins to move down, and the upper blade 633 cuts the rear end of the sheet bundle as shown in FIG. 8. Since the shutter 625 is pushed by the cams 636 connected to the upper blade 633, the shutter 625 opens the path from a cutting portion to the dust box 635 through which cutting wastes pass before the sheet bundle is cut. After the cutter unit 631 stops once in the vicinity of the lower dead point D as the vicinity of the lowermost point of the movable region of the link 637, it returns up to the initial position (the upper dead point U in the vicinity of the uppermost point of the movable region of the link 637). The time during which the cutter unit 631 stops at the lower dead point D is set to conform with a bundling time of the minimum number of sheets of the sheet bundle which is made by the saddle-stapled book binding unit 800. Since the cutter unit 631 stops at the lower dead point D, the time, during which the shutter 625 opens the waste path, is secured, thereby the cutting wastes G attached to the upper blade 633 securely drop into the dust box 635. Further, as the cutter unit 631 returns to the initial position (upper dead point U), the cams 636 are separated from the shutter 625, and the shutter 625 closes the waste path by a not shown twist coil spring. Thereafter, the stopper 641 described above evacuates, and the conveying operation of the third conveying unit 640 is resumed. The sheet bundle is delivered to the fourth conveying unit 650 disposing downstream of the third conveying unit 640.

The third conveying unit 640 and the fourth conveying unit 650 are provided with sensors 670, 671, 672, 673 which are disposed along the conveying path and act as a detection unit for detecting the sheet bundle being conveyed as shown in FIG. 2. The length in the sheet conveying direction of the sheet bundle being conveyed is determined and the number of sheet of the bundle is counted using the signals detected by these sensors.

Figure 9:
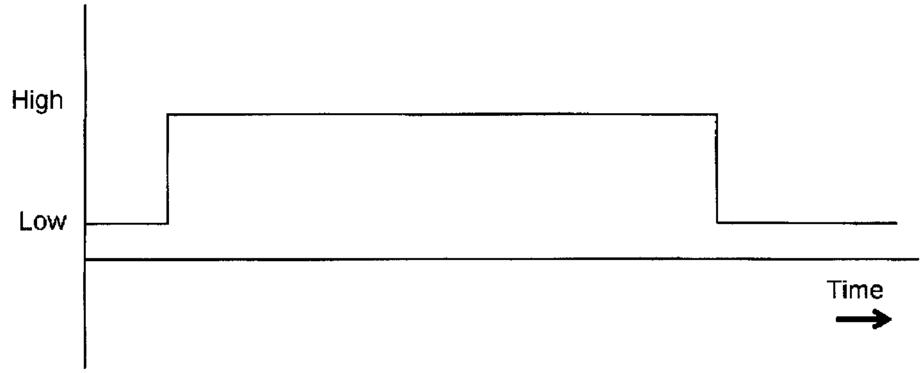
FIG. 9 is a view illustrating a signal detected by a sensor.

FIG. 9 shows a signal detected by the sensor 671 when the sheet bundle is conveyed in the third conveying unit 640. Note that the signals when the sheet bundle is detected by the sensor 670, 672, 673 are the same as the above signal although the locations where they are detected are different.

When the sensor 671 detects a sheet bundle, it outputs a HIGH signal (ON), and when a time elapses and the sheet passes through the position where it is detected by the sensor 671, the HIGH output returns to a LOW output (OFF). In this case, since one signal is issued to one sheet bundle, the finisher controller 501 as a controller determines that a conveying operation is normally performed based on the signal.

The sheet bundle conveyed upward by the fourth conveying unit 650 is discharge onto the discharge tray unit 660 and sequentially stacked thereon in a tile state. Since a discharge port is disposed to an upper portion by the fourth conveying unit 650, the user can take out the sheet bundle more easily.

(Conveying of Cutting Wastes)

The cutting wastes G as the cut pieces cut by the cutter unit 631 ordinarily drops into the dust box 635. However, since the cutting wastes G drop into the dust box 635 making use of self weight, they may be retarded from dropping due to external causes of static electricity, air resistance, friction resistor. In this case, the cutting wastes G move up together with the upper blade 633 and drop onto the lower blade 634 and the conveying belt 646 at an uncertain timing. The dropped cutting wastes G are caught by the conveying belt 646 and a succeeding sheet bundle and conveyed through the third conveying unit 640. In this case, in the sheet processing apparatus of the embodiment, the cutting wastes G being conveyed are not determined as a product and subjected to an ordinary sheet conveying process.

Next, an arrangement for this processing will be described. Note that although a case, in which a sheet or cutting wastes being conveyed by the conveying belt pairs 645, 646 are detected by the sensor 671, will be described here, cases, in which they are detected by the sensors 670, 672, 673, are the same as the above case.

Figure 10A:
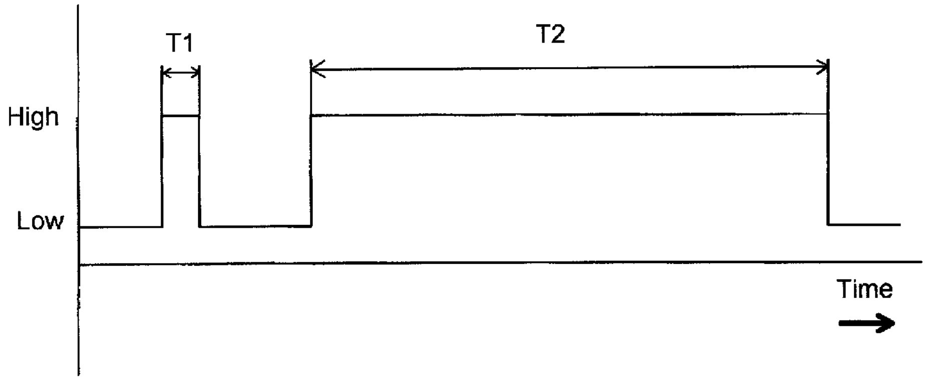
FIG. 10A is a view illustrating a signal detected by a sensor when cutting wastes are conveyed.
Figure 10B:
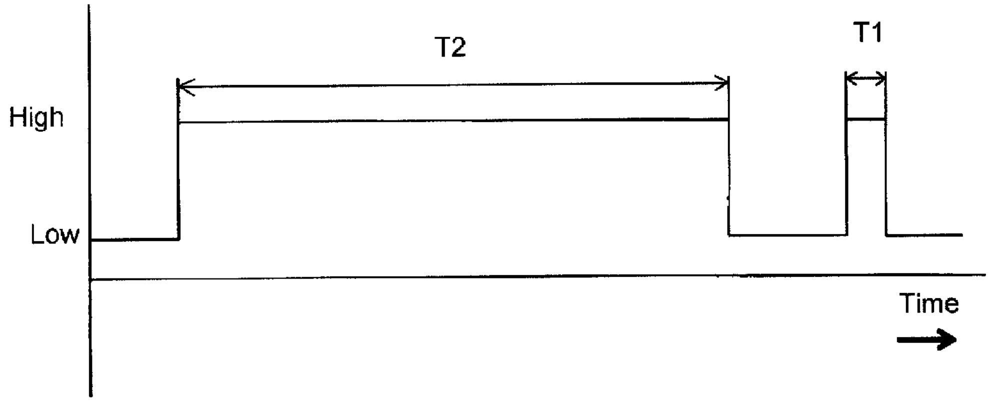
FIG. 10B is a view illustrating a signal detected by a sensor when cutting wastes are conveyed.

A signal detected by the sensor 671 when the cutting wastes G are conveyed while being caught by the sheet bundle is as shown in FIGS. 10*a* and 10*b*. FIG. 10*a* shows that the cutting wastes G pass through the sensor 671 first, and then an ordinary sheet bundle passes therethrough. Further, FIG. 10*b* shows that an ordinary sheet bundle passes through the sensor 671 first, and then cutting wastes G pass therethrough.

Ordinarily, the length in the sheet conveying direction of the cutting waste G is about 2 cm at the maximum. On the other hand, the length in the sheet conveying direction of a sheet bundle made by saddle stitching and cutting sheets of A3 size, A4 size like is longer than the cutting wastes G. Accordingly, as shown in FIGS. 10*a*, and 10*b*, since the length in the sheet conveying direction of the cutting waste G is ordinarily shorter than an ordinary sheet (the maximum length of cut piece; L1), the time T1 during which the cutting waste G passes through the sensor 671 is definitely different from the time T2 during which the ordinary sheet passes therethrough (the minimum length of the sheet being conveyed; L2) (T1<T2). Therefore, the cutting waste G can be discriminated by comparing the path time T2 of the minimum length conveying sheet with the path time T1 of the maximum length cutting waste G.

Figure 11:
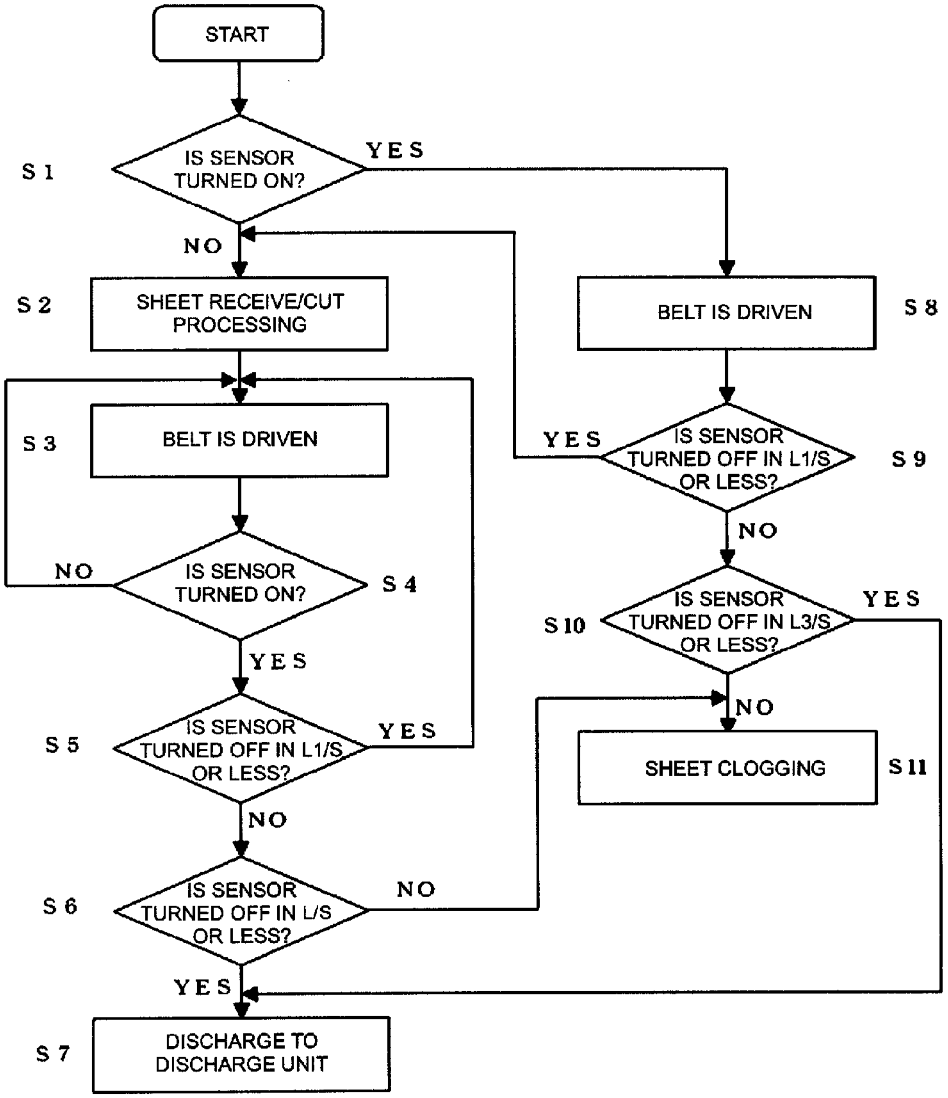
FIG. 11 is a flowchart illustrating an operation procedure performed when cutting wastes are conveyed.
Figure 12:
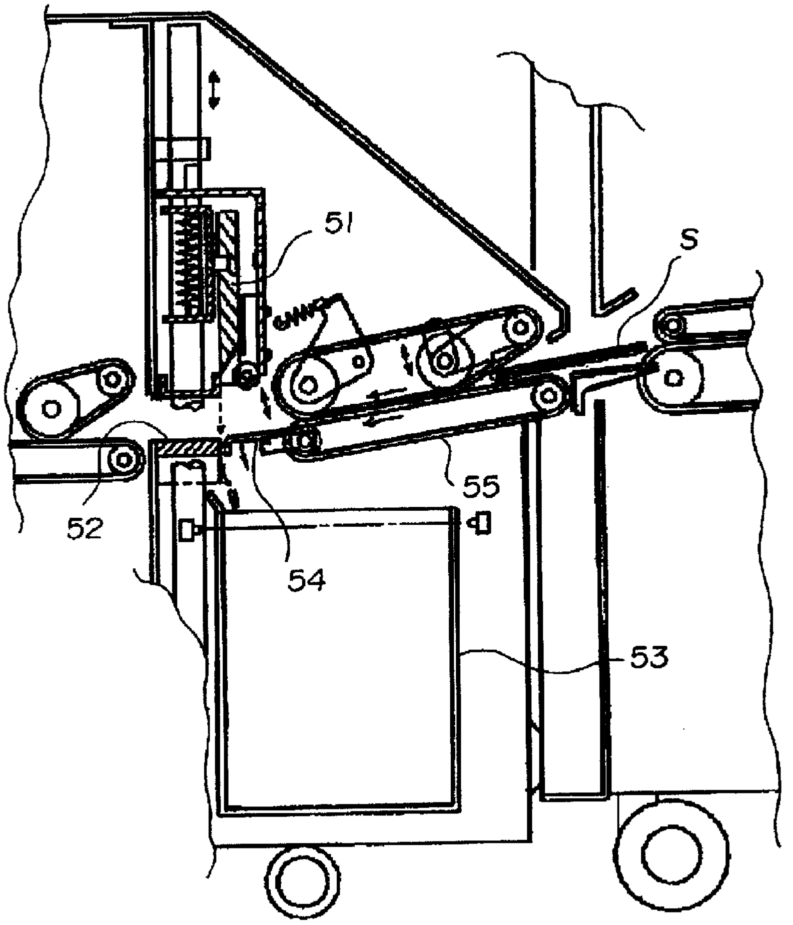
FIG. 12 is a view illustrating a conventional apparatus.

As shown in a flowchart of FIG. 11, the sheet cut by the cutter unit 631 is conveyed to the third conveying unit 640 by the conveying belt pairs 645, 646 (S2, S3). At the time, when the cutting waste G or the sheet passes through the detecting position of the sensor 671, the sensor 671 is turned on (S4).

At the time, when it is assumed that the conveying speed of the conveying belt pairs 645, 646 is set to s, the finisher controller 501 determines whether or not the sensor 671 is turned off in a time T1(L1/s) or less (S5). When the sensor 671 is turned off in the time T1 or less at the time, that is, when a sheet has a length equal to or less than a predetermined length, it can be determined that the sheet is the a cutting waste G. Accordingly, at the time, the sheet is not determined as an ordinary sheet and the belts are driven as they are (S5). That is, when the cutting waste G is conveyed, a signal issued by detecting the cutting waste G is ignored, and the respective components are driven as they are. Note that, since the cutting waste G has a short length in the sheet conveying direction, even if it is conveyed as it is, it does not obstacle conveyance of sheet.

On the other hand, when the sensor 671 is not turned off in the time Ti after it is turned on, it is determined next whether or not it is turned off in a time T(L/s) or less (S6). When the sensor 671 is turned off in the time T or less, a discharge processing is performed determining that the sheet is the ordinary sheet (S7), whereas when it is not turned off after the time T passes, an alarm is issued and the belts are stopped determining that sheet jam occurs (S11). The length L at the time is set based on the sheet size input from the operation unit, and a predetermined length is added to it as a margin in consideration of slip in conveyance, wear of conveying rollers.

When the cutting waste G is conveyed together with the sheet bundle as described above, two detection signals are issued to one sheet. However, the finisher controller 501 determines that only the detection signal, which is turned off in a time longer than the time T1(L1/s) and shorter than the time T(L/s), detects the ordinary sheet. With this operation, even if the cutting waste G remains on the conveying path and passes through the sensor position, no failure occurs in control. Since the signal issued by detecting the cutting waste is not counted, the correct number of conveyed sheets, for example, can be grasped.

Note that the sensor 671 is disposed in a midway of the conveying belt pairs 645, 646 which can continuously convey the sheet and the cutting waste from the upstream side of the sheet detecting position of the sensor 671 to the downstream side thereof. Therefore, as long as sheets are continuously conveyed, the cutting wastes do not stop on the sensor.

Next, a control will be described which is performed when the cutting waste G stops on the sensor before the operation of the image forming apparatus is started, that is, before the sheet begins to be conveyed by the conveying belt pairs 645, 646. This state may occur when a power supply is instantly interrupted at the time the cutting waste G passes on the sensor.

In this case, in the finisher controller 501, the sensor 671 is turned on and can detect the sheet. However, the finisher controller 501 cannot determine whether or not the sensor 671 is turned on by the cutting waste. To cope with this problem, the conveying belt is driven first as shown in the flowchart of FIG. 11 (S8) in this state (S1).

When the signal detected by the sensor 671 which is turned off in the time T1(L1/s) or less corresponding to the time in which the longest cutting waste is conveyed in the sheet conveying direction, a sheet being conveyed at the time is not determined as the ordinary sheet, and the belts are driven as they are (S9) likewise the case described above.

In contrast, when a detection signal is turned on for a time a predetermined time longer than a time T3 (L3/s) corresponding to the time in which a sheet having the maximum conveyable length is conveyed, it is determined that an ordinary sheet is clogged, and an alarm is issued and the operation is stopped (S10, S11). A length L3 is set by adding a margin of a predetermined length, which is determined in consideration of slip in conveyance, wear of conveying rollers to the length of the sheet having the maximum conveyable length. When a sheet stops at the detecting position of the sensor 671 before an image forming operation starts, the size of the sheet is not known when a power supply is turned on. Accordingly, it is determined that sheet jam occurs after a time passes which is longer than the time T3 (L3/s) corresponding to the time, in which the sheet having the maximum conveyable length is conveyed, by the predetermined time.

With the above operation, even if a cutting waste G stops on the sensor, the apparatus can be continuously operated without issuing an unnecessary alarm.

Note that, in the embodiment described above, when the sensor is turned off at the time a cutting waste having the maximum length in the sheet conveying direction is conveyed after it is turned on, the cutting waste is not determined as the ordinary sheet, and the sheet conveyance is continued. However, the time in which the sensor is switched from an on-state to an off-state may be set to a time which is a little longer than the time in which a cutting waste that is longest in the sheet conveying direction passes. When such a sheet piece is located on the belt, even if it is conveyed and discharged as it is, no failure occurs, and thus an unnecessary alarm need not be issued.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-048846, filed Feb. 28, 2007, which is hereby incorporated by reference herein in its entirety.

What is claimed is:

1. A sheet processing apparatus comprising:

a cutting unit which cuts a sheet into a cut sheet and cutting waste;

a conveying unit which conveys the sheet cut by the cutting unit;

a detection unit which detects a passage of the sheet conveyed by the conveying unit; and a controller which determines a length in the sheet conveying direction of the conveyed sheet based on a detection result of the detection unit, wherein the controller determines that the sheet is cutting waste when a determined length in the sheet conveying direction of the conveyed sheet is equal to or less than a predetermined length, the controller determines that the sheet is a cut sheet when the determined length in the sheet conveying direction of the conveyed sheet is longer than the predetermined length, and when the detection unit is in a sheet detection state before the sheet begins to be conveyed by the conveying unit, the controller controls the conveying unit so that the sheet is conveyed by a conveying amount corresponding to the predetermined length in the sheet conveying direction, and when the detection unit stops detecting the sheet after the sheet is conveyed by the conveying amount, the controller determines that the sheet is cutting waste.

2. The sheet processing apparatus according to claim 1, wherein the predetermined length is a length in the sheet conveying direction of a maximum cutting waste.

3. The sheet processing apparatus according to claim 1, wherein, the controller controls the conveying unit based on the detection result of the detection unit so that, when the determined length in the sheet conveying direction of the conveyed sheet is longer than the length in the sheet conveying direction according to the size of a sheet to be conveyed in the apparatus, the sheet is stopped by a determination that a sheet jam occurs.

4. The sheet processing apparatus according to claim 1, wherein, when the determined length in the sheet conveying direction of the conveyed sheet is less than the predetermined length, the controller continues conveyance of the sheet.

5. The sheet processing apparatus according to claim 1, wherein, when the determined length in the sheet conveying direction of the conveyed sheet is longer than the length in a sheet conveying direction of a sheet having a maximum length which can be conveyed by the conveying unit, the controller determines that sheet jam occurs and stops conveyance of the sheet.

6. The sheet processing apparatus according to claim 1, wherein the conveying unit can continuously convey cut sheets and cutting waste in the sheet conveying direction from upstream to downstream of the position at which the detection unit detects a sheet.

7. The sheet processing apparatus according to claim 1, wherein the predetermined length is less than a length in the sheet conveying direction of a minimum cut sheet to be conveyed in the apparatus.

8. The sheet processing apparatus according to claim 1, wherein the conveying unit has a conveying belt, and the detection unit is disposed at a midpoint in the sheet conveying direction of the conveying belt.

9. An image forming apparatus comprising an image forming unit and a sheet processing apparatus which cuts and conveys a sheet on which an image is formed, wherein the sheet processing apparatus includes:

a cutting unit which cuts a sheet into a cut sheet and cutting waste;

a conveying unit which conveys the sheet cut by the cutting unit;

a detection unit which detects a passage of the sheet conveyed by the conveying unit; and a controller which determines a length in the sheet conveying direction of the conveyed sheet based on a detection result of the detection unit, wherein the controller determines that the sheet is cutting waste when a determined length in the sheet conveying direction of the conveyed sheet is equal to or less than a predetermined length, the controller determines that the sheet is a cut sheet when the determined length in the sheet conveying direction of the conveyed sheet is longer than the predetermined length, and when the detection unit is in a sheet detection state before the sheet begins to be conveyed by the conveying unit, the controller controls the conveying unit so that the sheet is conveyed by a conveying amount corresponding to the predetermined length in the sheet conveying direction, and when the detection unit stops detecting the sheet after the sheet is conveyed by the conveying amount, the controller determines that the sheet is cutting waste.

10. The image forming apparatus according to claim 9, wherein the predetermined length is a length in the sheet conveying direction of a maximum cutting waste.

11. The image forming apparatus according to claim 9, wherein, the controller controls the conveying unit based on the detection result of the detection unit so that when the determined length in the sheet conveying direction of the conveyed sheet is longer than the length in the sheet conveying direction according to the size of a sheet to be conveyed in the apparatus, the sheet is stopped by a determination that a sheet jam occurs.

12. The image forming apparatus according to claim 9, wherein, when the determined length in the sheet conveying direction of the conveyed sheet is less than the predetermined length, the controller continues conveyance of the sheet.

13. The image forming apparatus according to claim 9, wherein, when the determined length in the sheet conveying direction of the conveyed sheet is longer than the length in the sheet conveying direction of a sheet having a maximum length which can be conveyed by the conveying unit, the controller determines that sheet jam occurs and stops conveyance of the sheet.

14. The image forming apparatus according to claim 9, wherein the conveying unit can continuously convey cut sheets and cutting wastes in the sheet conveying direction from upstream of the position at which the detection unit detects a sheet to a downstream position.

15. The image forming apparatus according to claim 9, wherein the predetermined length is less than a length in the sheet conveying direction of a minimum cut sheet to be conveyed in the apparatus.

16. The image forming apparatus according to claim 9, wherein the conveying unit has a conveying belt, and the detection unit is disposed at a midpoint in the sheet conveying direction of the conveying belt.

* * * * *